(No Model.) 7 Sheets—Sheet 1.

J. W. SPANGLER.
CORN PLANTER.

No. 350,163. Patented Oct. 5, 1886.

Fig. 1.

WITNESSES
Franck L. Ousand
E. A. Finckel

INVENTOR:
Jacob W. Spangler
by Wm H. Finckel
Attorney (No Model.) 7 Sheets—Sheet 2.

J. W. SPANGLER.
CORN PLANTER.

No. 350,163. Patented Oct. 5, 1886.

WITNESSES
Franck L. Ourand
E. A. Finckel

INVENTOR
Jacob W. Spangler
by Wm N. Finckel
Attorney (No Model.)   7 Sheets—Sheet 3.

J. W. SPANGLER.
CORN PLANTER.

No. 350,163.   Patented Oct. 5, 1886.

WITNESSES
Franck L. Ourand
E. A. Finckel

INVENTOR:
Jacob W. Spangler
by Wm. H. Finckel
Attorney (No Model.)  7 Sheets—Sheet 4.

J. W. SPANGLER.
CORN PLANTER.

No. 350,163.    Patented Oct. 5, 1886.

WITNESSES

INVENTOR:
Jacob W. Spangler
by Wm. H. Finckel
Attorney.

(No Model.) 7 Sheets—Sheet 5.

J. W. SPANGLER.
CORN PLANTER.

No. 350,163. Patented Oct. 5, 1886.

WITNESSES
Franck L. Ourand
E. A. Finckel

INVENTOR:
Jacob W. Spangler
by Wm. N. Finckel
Attorney

(No Model.) 7 Sheets—Sheet 6.

J. W. SPANGLER.
CORN PLANTER.

No. 350,163. Patented Oct. 5, 1886.

WITNESSES
Franck L. Ourand
E. A. Finckel

INVENTOR:
Jacob W. Spangler
by Wm. H. Finckel
Attorney.

UNITED STATES PATENT OFFICE.

JACOB W. SPANGLER, OF YORK, PENNSYLVANIA.

CORN-PLANTER.

SPECIFICATION forming part of Letters Patent No. 350,163, dated October 5, 1886.

Application filed March 24, 1884. Renewed February 26, 1886. Serial No. 193,378. (No model.)

*To all whom it may concern:*

Be it known that I, JACOB W. SPANGLER, a citizen of the United States, residing at York, in the county of York and State of Pennsylvania, have invented certain new and useful Improvements in Corn - Planters, of which the following is a full, clear, and exact description.

This invention relates to that class of wheeled corn-planters in which the number and distance apart of the grains dropped are regulated by a rotary grain-dropping mechanism arranged in the bottom of a grain-holding hopper, from which the corn is taken grain by grain by said dropping mechanism and discharged into a "boot" or chute, and by it deposited in a furrow made for it by a share in front of it, and thereafter covered in.

The object of the invention is to improve the construction of the dropping mechanism, to the end that its functions shall be more fully performed, and with greater certainty under its several adjustments, than has been possible with any prior machine to me known, and in such manner that the depositing of the grain may be under the eye of the operator. The improvements also extend to details of construction of the machine as a whole, and to the combination therewith of certain new features in mechanism for supplying fertilizer to or with the corn being or as it is planted, the fertilizer-distributer being in advance of the corn-planter, so as to place said planter in full view of the operator.

Having thus stated, generally, the purposes of my invention, I will now proceed to describe it in detail, and finally set out in the claims those features I hold to be original with me and new and useful, and referring to the accompanying drawings, illustrating my invention, in the several figures of which said drawings like parts are similarly designated.

Fig. 3ª is a top plan view, partly multilated, of the grain-feed, and Fig. 4ª, a similar view with the parts in a different adjustment. Figs. 12 and 13 are perspective views of two forms of caps for the discharge - throat of my fertilizer distributer, forming the subject - matter of my Letters Patent dated April 1, 1884, and numbered 296,239. Fig. 14 is a vertical section on line $y\ y$, Fig. 1, larger scale, of the driving clutch-gear; Fig. 15, a view in elevation of the face of the idler member of this clutch-gear; Fig. 16, a similar view of the opposed face of the acting member of the same. Fig. 17 is a vertical cross-section of the fertilizer-agitator attachment; Fig. 18, a perspective view of the agitator, and Fig. 19 a perspective view of the hub, to which it is detachably connected.

To save confusion and avoid misunderstanding, I will here state that what I have hereinbefore designated the "dropping" mechanism is variously termed the "feed" or "feed-wheel;" but it may, for brevity's sake, be styled the "dropper," and said terms are herein used interchangeably. So, also, of the fertilizer - distributer, the active element is styled the "feed" or "feed-wheel."

Figure 1:
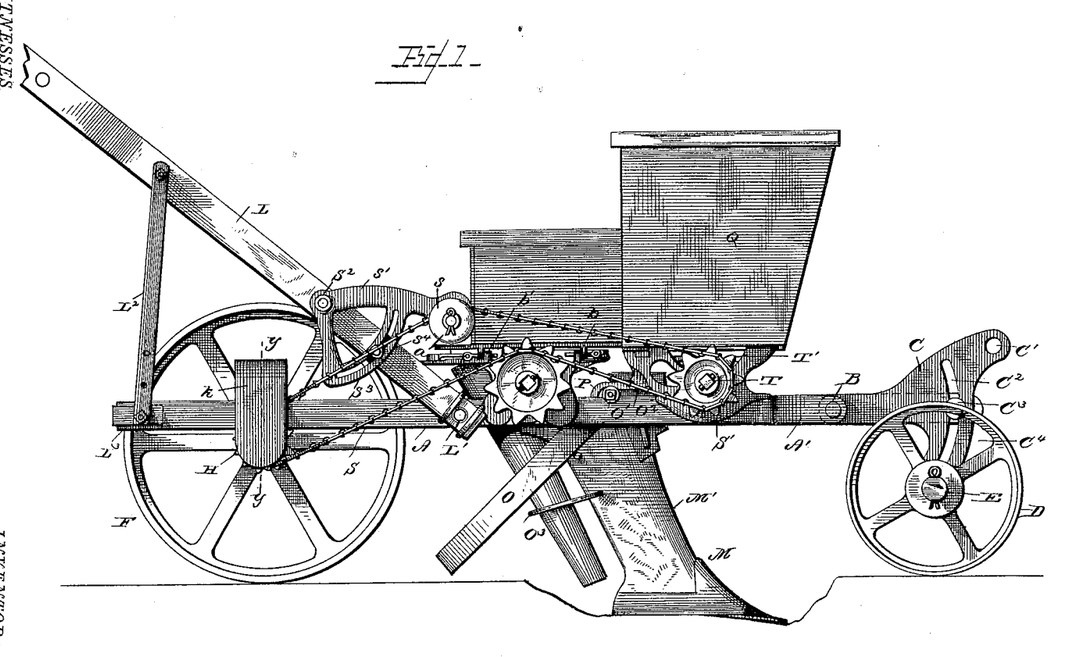
Figure 1 is a side elevation of one form of my machine.
Figure 2:
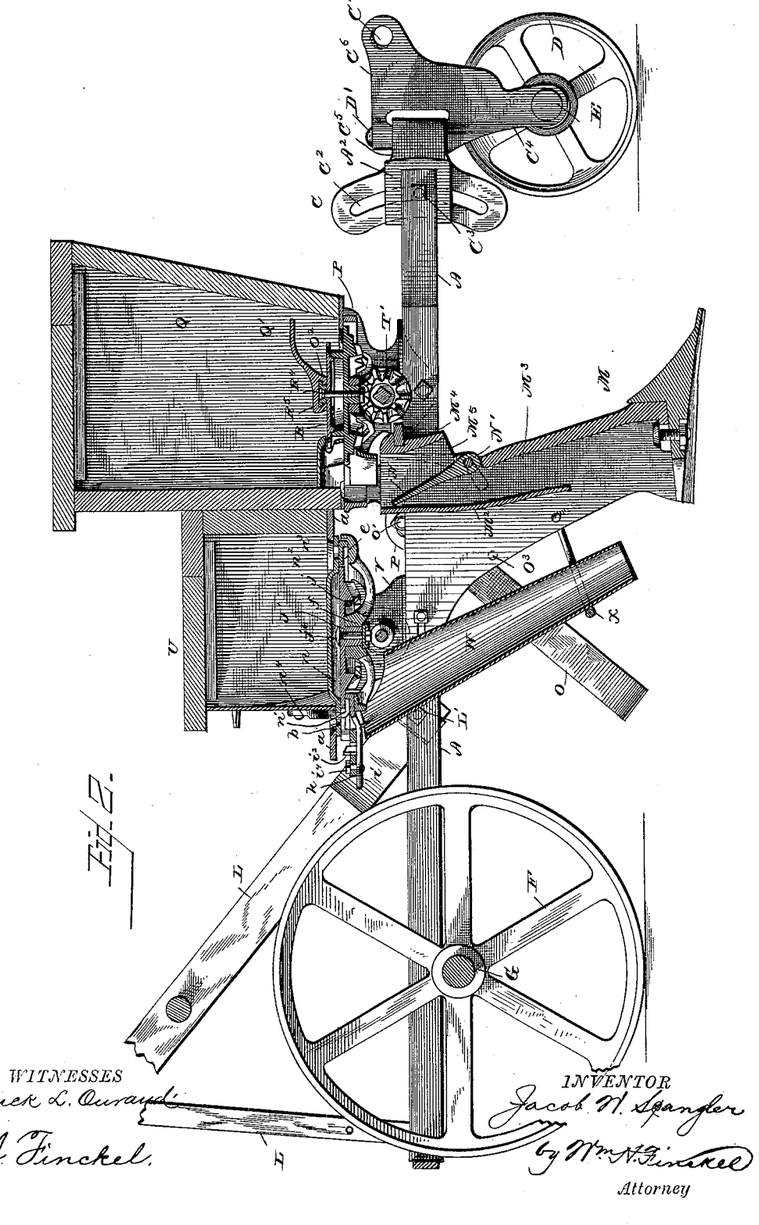
Fig. 2 is a central longitudinal vertical section, on a larger scale, of the same.

The frame-work A is economically made of metal, the sides of which recede from the forward end rearwardly. At the forward end, as shown in Fig. 1, one side, A', is longer than the other, and the two connected at the end of the short side by a bolt, B, which also serves to attach, pivotally, a clevis, C. This clevis is provided with an eye, C', for attaching the harness of the draft-animal, and it is adjustable up or down by a slot, C², in it, and a bolt, C³, which connects it with the side A' of the frame, which side serves as a stay for it to prevent injurious lateral strain. To the lower end, C⁴, of the clevis is journaled the pioneer-wheel D, a pin, E, thereon securing it and on which it revolves. By this construction I can use a very large pioneer-wheel, and yet secure the proper line of draft, and can adjust the wheel high or low, according to the depth of furrow. By employing a large pioneer-wheel there is less clogging of it, and consequently a very considerable, if not entire, diminution of the tendency of said wheel to deflect the machine by running out of the furrow. In Fig. 2 I have shown a modified form of this construction, wherein the frame A has its sides of equal length and coming close together, like an open-end >. Between the sides of the frame at this end is arranged a block, A², having its sides recessed horizontally to receive the frame, and having its inner opposite face or faces vertically recessed in an arc of a circle to receive the clevis C. This clevis is divided, and one part is curved in an arc of a circle and provided with a concentric vertical longitudinal slot, through which is passed the adjusting and retaining bolt C², which is also its pivotal bolt. This bolt passes through the frame, and the block A² also, horizontally. This part of the clevis is provided with a forwardly-projecting portion, C⁵, pierced with a vertical hole, and to it is fastened by the bolt D', or otherwise, the part C⁶ of the clevis, which is thus free to swing laterally on the part C⁵, to which it is, as it were, hinged, and at the same time it moves up and down with such adjustment of the clevis. Part C⁶ has the draft-hole C', and to its lower end, C⁴, is attached the pioneer-wheel D by pin E. This end C⁴ may be forked to receive the wheel D between its tines, to thereby stay and more accurately center it. By thus swiveling the wheel the machine may be more readily turned about and danger of toppling over avoided. The draft being directly on it gives it sufficient steadiness in running.

The machine is supported at its rear end by wheels F, fixed on a shaft, G, arranged transversely of the frame-work in bearings or boxes on the same, and this shaft G is rotated in its bearings by the wheels and constitutes the driving-shaft of the machine, whence motion is imparted to the other moving parts thereof. For transmitting motion from this shaft I employ a clutch-gear, H, (see details, Figs. 14, 15, and 16,) which consists of the sprocket-wheel I, having on its face teeth I', and loose on said shaft to freely turn independently thereof. The other member of this clutch-gear is a hub, J, having on its face teeth J', to engage the teeth I' of the sprocket-wheel I, to rotate it and the moving parts of the machine when the machine is moving forward, and to slip over said teeth when the machine is reversed or moved backward to stop such rotation. This hub J is fitted on a squared end, G', of the shaft G, and has a longitudinal movement thereon, and is held in place on said shaft and in engagement with the sprocket-wheel by a flat curved spring, K, bolted to the frame-work. This spring K yields to the movement of the hub J on the backward movement of the machine. The said spring is of considerable width, overhangs the clutch-gear, covers it rear and front, and thus also serves as a guard or shield to keep said gear clear of dust and dirt. When the machine is not planting, as in transportation or going to and coming from the field, the hub J is taken off its shaft, and thus the movement of the feeding mechanism is stopped, inasmuch as the wheel I is loose on shaft G and turns on it.

L are the handles for guiding the machine, pivoted to the frame-work at L', and provided with depending straps L² between their ends, which straps are provided at their lower ends with a plurality of holes, through one of which in each bolts L³ are passed, to fasten the said straps to the frame-work, said bolts being readily removable, and, in connection with the plurality of holes in the straps, admitting of the vertical adjustment of the handles to suit operators of different height.

The share or furrow-opener M is provided with a removable point bolted thereto, as usual, and its standard M' is suitably secured to the frame-work and is hollow at the rear, with a vertical partition-wall, M², substantially parallel with the front wall of the standard and extending from side to side of the standard, forming therein a tube, M³. The forward upper end of this standard is made with a projecting lip, M⁴, cut away at its lower end to form an opening, M⁵, into and from the tube M³ in said standard, and in this opening is arranged a gate, N, extending up into the tube M³, and provided at its lower end with a spindle, N', having a handle at one end, (shown in dotted lines, Fig. 2,) said spindle having bearings in the standard, which bearings may be friction-bearings, so as to hold the gate securely in whatever position it may be turned by its handle.

Instead of friction-bearings for the spindle N', the gate may be held in its desired position by any other suitable and well-known mechanism—such as a notched segment and lever—to engage it, or a binding device—such as a nut and washer on the spindle—for purposes hereinafter appearing.

The coverer consists of arms O, the lower opposite ends of which are curved toward each other to cover a space immediately in the rear of the share, to throw the earth into the opening made by the share to cover in the deposited grain. These arms are arranged on opposite sides of the standard at an incline thereto, and are adjustably secured by bolts O', passed through slots O² in castings P, bolted to the frame-work A, so that their elevation with respect to the bottom of the share may be varied in accordance with depth to which the share opens the furrow. Pins O³, projecting laterally from opposite sides of the standard, prevent the arms O from falling, and, in conjunction with the bolts O', secure said arms at the proper elevation, and so that their ends will be in all adjustments in substantially the same vertical plane with respect to the standard.

Figure 12:
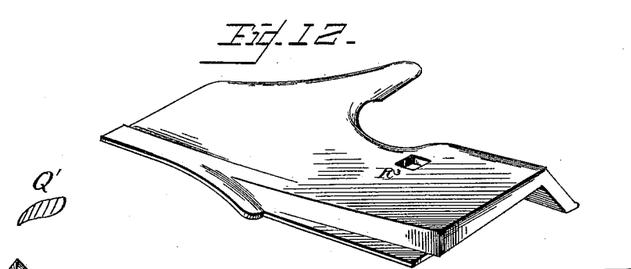

Q is a hopper or box for containing fertilizer, and mounted on the castings P in front of the grain-hopper, and containing in its bottom any suitable fertilizer-distributing mechanism, feeder, or feed-wheel R, with its discharge-throat arranged over the tube $M^3$ of the standard M, so as to discharge the fertilizer into said tube. I prefer to use, and have herein shown, the fertilizer distributer or feeder forming the subject-matter of the Letters Patent hereinbefore referred to, for a fuller description of the construction and operation of which reference may be had to said application. In using this feeder for distributing barn-yard fertilizer, owing to the nature of such fertilizer, a larger area of exit from the hopper to the discharge-opening is required than for factory-made fertilizer. Hence, instead of the cap shown in Fig. 12 for such discharge-opening, which is adapted for the latter class of fertilizer, I employ the cap shown in Fig. 13, wherein the crown R' is much higher than the other and the passage $R^2$ correspondingly larger. These caps may be furnished with each machine, and are readily replaceable by removing the bolt fastening them, the hole for such bolt being shown at $R^3$. The large cap, Fig. 13, may also be used with other fertilizer, when it is desired to discharge a large quantity.

Some kinds of fertilizer require an agitator, to insure it from becoming so compacted as to feed imperfectly, or not at all, and, again, others feed best without agitation. To adapt my fertilizer-distributer to both kinds, I provide it with a readily attachable and detachable agitator, (shown in Figs. 2, 17, and 18,) as a horizontal finger, Q', curved upwardly from its base $Q^2$, and of a length to sweep over the space above the upper surface of the feed-wheel. The base of this agitator has in its under side a recess or socket, $Q^3$, and at opposite ends of this recess are lips $Q^4$, extending toward each other, the adjacent faces of which are arcs of a circle, and the upper faces oppositely beveled, as indicated at $Q^5$. The bolt $R^4$, used to secure the fertilizer feed-wheel to its base, is utilized to fasten to the top surface of the feed-wheel a hub, $R^5$, and said bolt has the head end of its shank squared to engage a square hole in said hub to prevent it from turning. As additional security in this direction, the hub has teats $R^6$ on its bottom, which enter holes or cavities in the face of the feed-wheel. This hub has diametrically-opposite laterally-projecting horizontal lugs $R^7$, the under sides of which are beveled to register with the bevel of the lips $Q^4$ of the agitator, so that when such agitator has its socketed base placed down over the hub, with its ears at right angles to the lugs of the hub, and is then given a quarter-turn, the ears will engage the lugs and the agitator be locked to it. The direction of turning the agitator to lock it to the hub is opposite the direction of rotation of the feed wheel; hence the resistance of the mass of fertilizer will tend to strengthen the union of the agitator with its hub.

Figures 13, 14, 15, 16, 17, 18, 19:
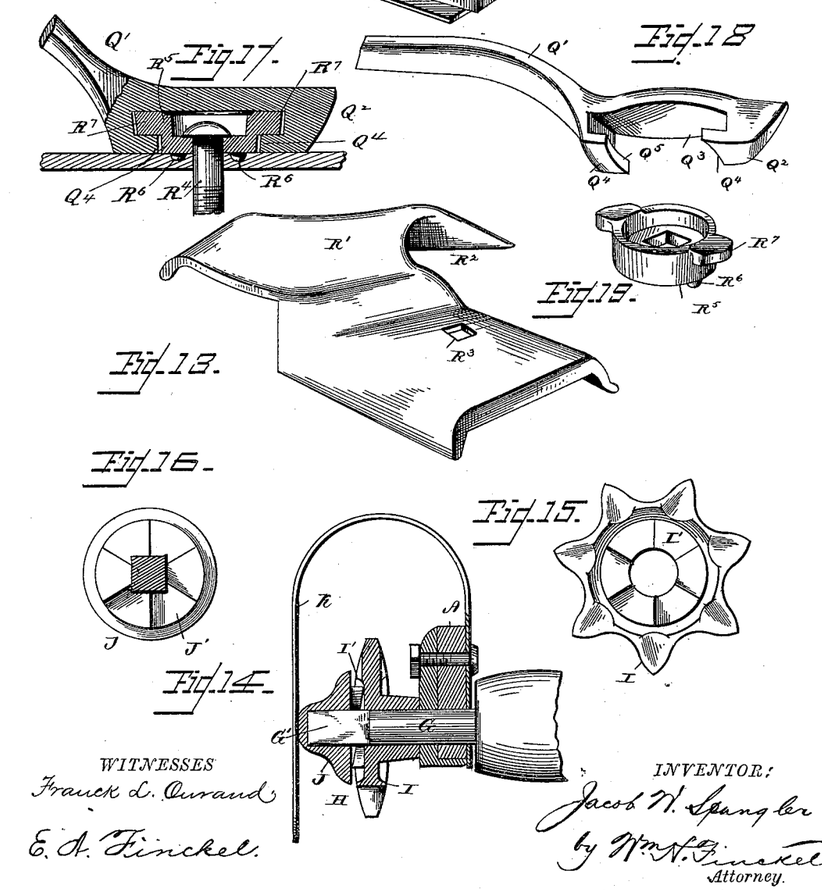

As is obvious, when the agitator is not to be used, it may be readily removed by a slight blow in the direction of rotation or on its back. The active face of the agitator is edged, as indicated in Fig. 17, at the end and in cross-section just above said figure at Q'.

Rotary motion is given to the gearing driving the fertilizer-distributer by a chain, S, extending from the sprocket-wheel I of the clutch-gear to the sprocket-wheel S' of the shaft T, carrying the driving gear T' of the fertilizer-feeder.

By means of the gate N entire control of the place of deposit of the fertilizer is had. When it (the said gate) is in the position shown in full lines, Fig. 2, the material will be thrown out on the furrow-surface through the opening $M^5$ in front of the share and in advance of the grain being planted. When in the dotted-line position, the fertilizer will be directed into the tube $M^3$, and be deposited, along with the grain, in the opened furrow, and when the gate occupies an intermediate position the stream of fertilizer will be divided and part discharged through the opening $M^5$ in advance of the grain, and the remainder through the tube $M^3$ with the grain. I have the fertilizer thus under entire control, and can deposit it to the best advantage.

Figure 3:
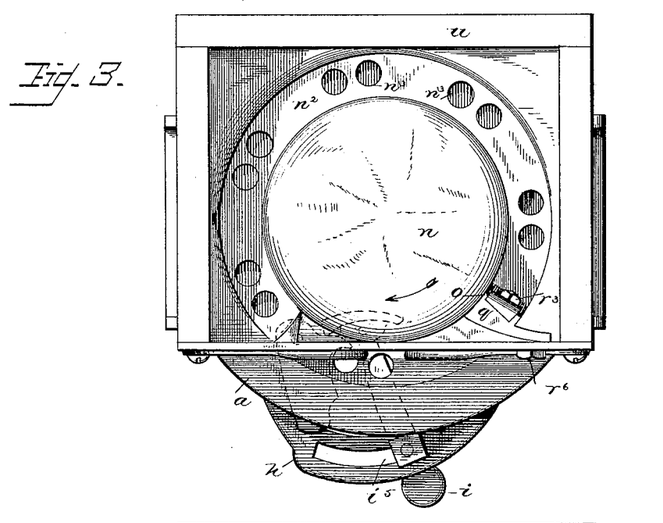
Fig. 3 is a top plan view, on a larger scale, of the grain-hopper, its cover being removed.
Figure 3A:
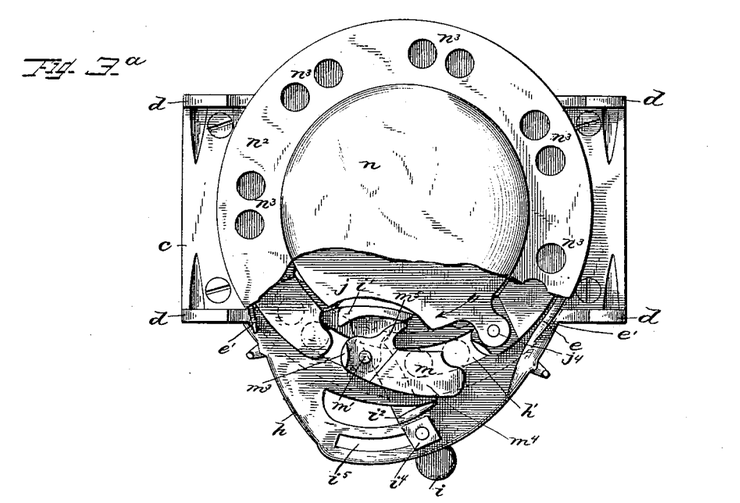
Figure 4:
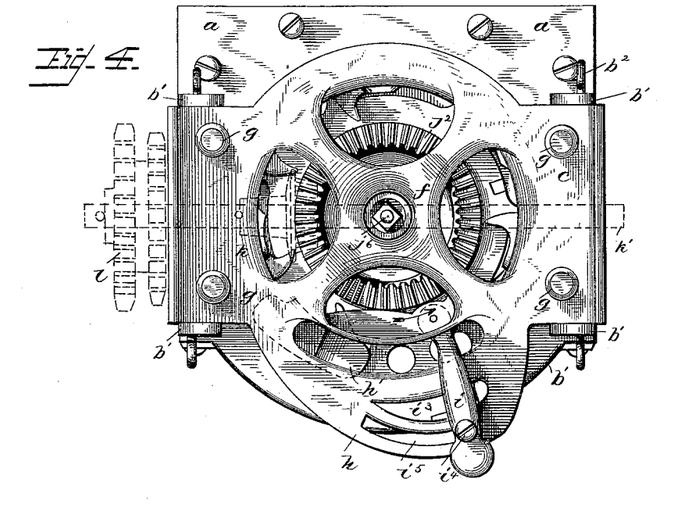
Fig. 4 is a bottom plan view of the dropping mechanism, showing its driving-gearing in position in broken lines.
Figure 4A:
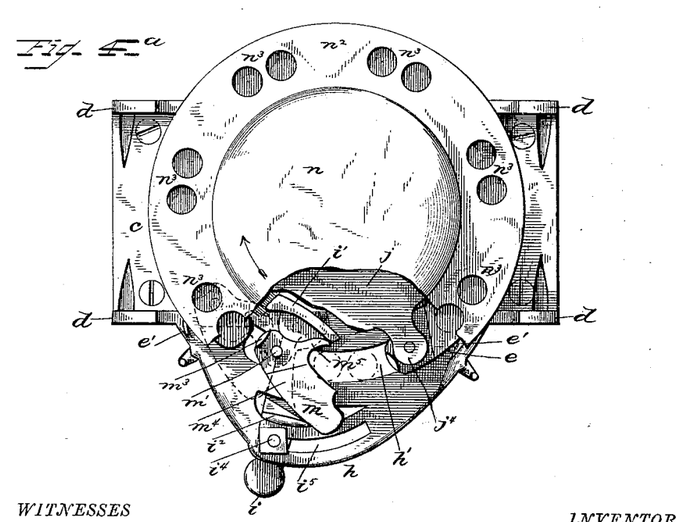
Figure 5:
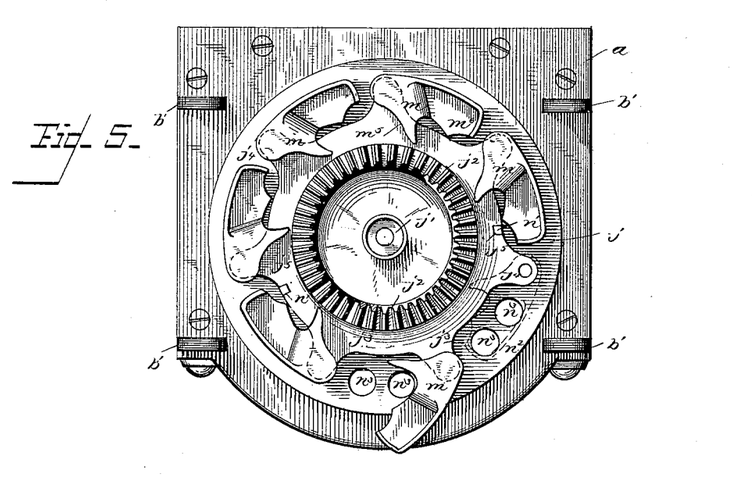
Fig. 5 is a bottom plan view of the same with the bed-plate and its appurtenances removed.
Figure 6:
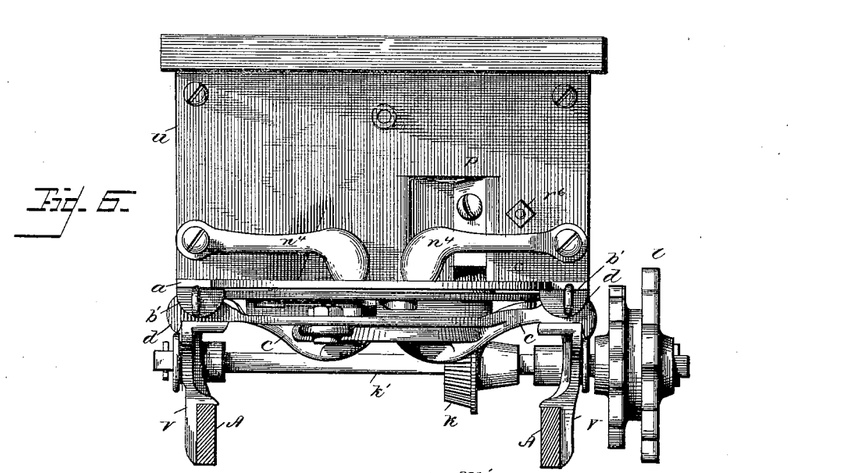
Fig. 6 is a rear elevation of the grain-hopper with the dropping mechanism, driving-shaft and its bearings.
Figure 7:
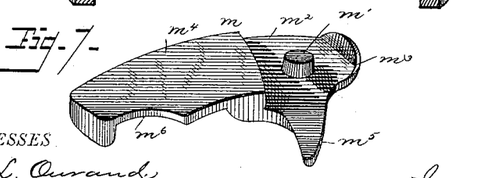
Fig. 7 is a top perspective view, on a still larger scale, of one of the grain-feed valves of the dropping mechanism.
Figure 8:
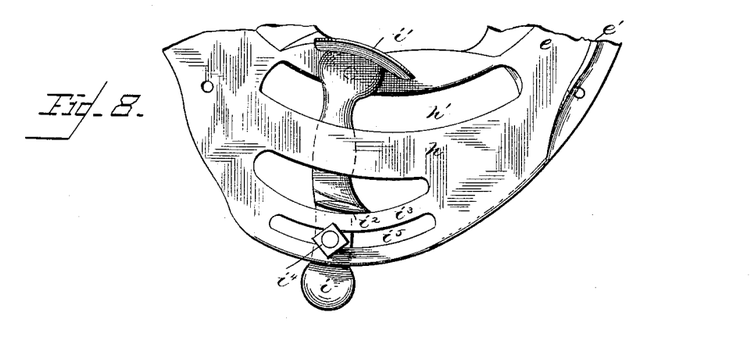
Fig. 8 is a top plan view, on an enlarged scale, of the shipper-lever for changing the extent of opening of the valves of the dropping mechanism, it being in an intermediate position and shown with its bearing on the bed-plate of the dropping mechanism.
Figure 9:
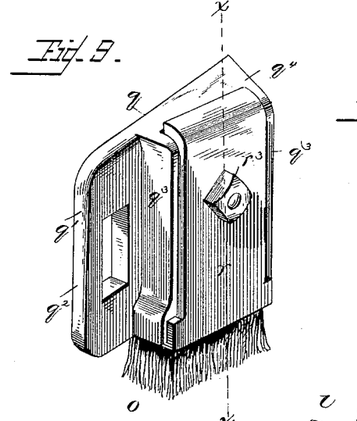
Fig. 9 is a perspective view, same scale, of the brush for the dropping mechanism.
Figure 10:
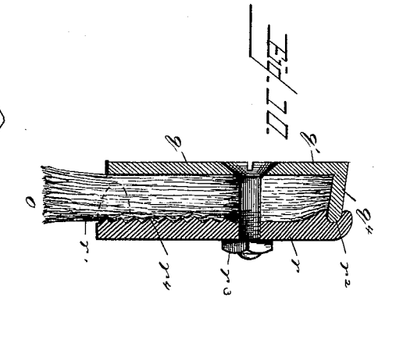
Fig. 10 is a vertical section of the same in the plane of line $x\ x$, Fig. 9.

U is a hopper or box arranged in rear of the fertilizer-distributer mechanism on castings V, secured to the frame-work, so that it may be in constant view of the operator, that he may see its operation. The bottom $a$ of this box is preferably of metal extending out rearwardly beyond the box, as shown in Figs. 2 and 3, and it is provided with an opening, $b$, part of which also projects outside of the box, and with the vertical lugs $b'$. Within and beneath this opening is arranged the grain-dropping mechanism or feeder proper, and it is constructed, in this instance, substantially as follows: $c$ is a bed plate or spider having the vertical lugs $d$, Fig. 6, the annular flat surface or bed proper, $e$, and the bearing $f$. This bed-plate is secured to the castings V by stove-bolts $g$, and the box is secured detachably to the bed-plate by spring-pins $b^2$, engaging the vertical lugs $d$ and $b'$ by passing horizontally through registering-holes therein. By thus connecting the box and bed-plate said box is practically hinged, for on removing the pins connecting the lugs $b'$ and $d$ on one side the others become hinges, on which the box may be turned over laterally, and access be thereby had to the feeder, &c., in the interior. This bed-plate $c$, furthermore, has a rearwardly-projecting segment, $h$, (see specially Fig. 8), to which is pivoted a lever, hereinafter, from its function, designated a "shipper," $i$. This shipper has at its fulcral end a cam-flange, $i'$, a lug, $i^2$, between the flange and the handle and working in a race, $i^3$, of the segment $h$, and a clamp-bolt, $i^4$, passing through the slot $i^5$ in the segment and a hole in the shipper near its handle end, this bolt serving to positively hold the lever in the position to which it may be thrown manually, for a purpose presently appearing. In the segment $h$ is a slot, $h'$, which constitutes the ultimate discharge-throat of the dropper, said slot being in an arc of a circle concentric with the plate carrying the grain to it. Beneath this slot, and to catch whatever falls through it, is the chute or boot W, suspended from the bed-plate, and connected to the standard, so as to properly convey the seed into the furrow, by the stirrup X, attached to the standard. (See Fig. 2.) $j$ is a circular flat plate provided with a hub, $j'$, which turns in the bearing $f$ of the bed-plate, and thereby serves to support such plate $j$ on said bed-plate. The plate $j$ is also provided with bevel gear-teeth $j^2$, arranged in a circle on its under side, and rotary motion is imparted to said plate by the engagement with its teeth of the bevel-gear $k$, which latter is on the shaft $k'$, supported in bearings in the castings V, said shaft also having the change-wheel $l$ on one end, which wheel $l$ is a sprocket-wheel driven from the clutch-gear H by the chain S. Near the outer edge of the plate $j$ a number of equidistant openings, $j^3$, are made, leaving spoke-like radial arms $j^4$, and to the under side of these arms are pivoted valves $m$, (see Figs. 2 to 5, inclusive, and 7,) which travel in the bed or race $e$ of the bed-plate as they are carried around by the rotating plate $j$. These valves are arranged in the openings $j^3$ in the plate $j$, and are made with a pivotal lug, $m'$, in a depressed portion, $m^2$, of a depth equal to the thickness of the arms $j^4$ of the plate $j$, the said lugs engaging holes in the said arms to connect the valves to the plate, and permit the valves to swing outward from the openings $j^3$, this outward movement being limited by a stop, $m^3$, on the heel of the valve, engaging one side of the arm, and by the lug $i^2$ in one position of the shipper. The body $m^4$ of the valve is made with a flat upper surface to fit in the opening $j^3$ and be flush with the upper surface of the plate $j$, and the body is recessed beneath, as shown, to save metal in casting and dead-weight. A cam-like toe or tappet, $m^5$, projects rearwardly from the pivotal point of the valve and extends beneath the plate $j$, and this tappet, as the plate is revolved, is engaged by the cam-flange $i'$ of the shipper $i$, and by it the valve is thrown outward from the plate on its pivot, to uncover more or less the discharge-opening $h'$ to drop the seed. The extent of this throw of the valves is regulated by the position of the cam-flange $i'$ of the shipper-lever $i$ with respect to the tappets, and the greater the throw the larger the extent of uncovering of the discharge-opening. The valves, after being thrown, and having passed the shipper, are returned by the flange $e'$ on the race or bed of the bed-plate. The plate $j$ has notches $j^5 j^5$ (see Fig. 5) in its openings $j^3$, for example. The plate $j$ is secured to the bed-plate by a bolt, $j^6$, passed through its hub and engaging the lower surface of the bed-plate. Covering the plate $j$ is a crown or cap, $n$, hereinafter called a "grain-carrier," attached thereto removably, but so as to revolve with it, by means of its lugs $n'$, (see Fig. 2,) engaging the notches $j^5 j^5$. The rim $n^2$ of this crown is flat and lies over the valves $m$, and it is provided with openings $n^3$, in pairs, which are coincident with the openings in the plate $j$, in which said valves are located. These openings $n^3$ of the cap are the grain-cells, and they have for their bottoms the flat-surfaced body $m^4$ of the valves, so that when the valve is thrown out by contact with the shipper the cell above it is opened to the discharge-slot $h'$, and the grain is free to descend to the ground. By proper adjustment of said shipper the valves may be thrown to uncover one or both cells of the pairs of cells to drop one or two grains at a time, and the rapidity of revolution of the dropper being governable by the change-gear, the frequency of the dropping may be varied, and hence the proximity of the grains as planted increased or diminished. The body of the valve is recessed at $m^6$, at its outer end, so that when the feeder is set to discharge one grain at a time the rearmost of the holes $n^3$ in the carrier-plate $n$ will be uncovered first and quickly to insure the discharge of the grain, (see Fig. 3$^a$,) where the parts are in this adjustment, and the flange $i^2$ of the shipper will prevent the valve from being thrown so far as to uncover more than one hole at a time. As the feeder progresses in the direction of rotation indicated by the arrows, the valve continues so far open till it reaches the other side of the shipper, when it is further opened to uncover the other hole of the pair to discharge its grain, as indicated by broken lines, Fig. 3. When the shipper is thrown to the other side of the hopper, as shown in Figs. 4, 4$^a$, and 5, the valves will be thrown to open both cells or holes simultaneously and discharge both grains at once. By dropping one grain at a time the seeds or grains are planted just half the distance apart of those dropped two at a time. The continual movement back and forth of these valves insures the clearance of the feeder, precludes sticking or clogging and accumulation of foreign matter.

The grain-carrier $n$ has an elevated central crown tapering or curving down annularly to the flat rim $n^2$, and this serves to insure the descent of the grain to the rim-openings $n^3$. Furthermore, this construction of the grain-carrier makes its casting less difficult and more accurate, for thereby it may be taken from the sand complete and without needing milling or straightening. For grain that is approximately round a carrier having round holes will be used, and for grain which is oblong a carrier with corresponding holes may be used, and the substitution of one form of carrier for another is readily made by turning aside the hopper on its hinges and lifting the carrier out of engagement with the plate $j$ and putting in the other, no bolts or other parts being disturbed in this change back and forth. The grains that may stick in the openings in the carrier $n$ are knocked out by the usual or any approved hammers $n^4$, pivoted to the rear wall of the hopper.

It is quite common to arrange the grain and fertilizer distributers of corn and other planters in line, and so that their feed may be visible as it progresses; but, so far as I am aware, no provision has heretofore been made for putting the grain-feed in view where a grain-feeder and fertilizer-distributer have been arranged one in front of the other. If the grain-feeding can be watched by the planter, there will be few, if any, bare places in the planted field, and any trouble with the grain-feeder will be instantly discovered and corrected. I gain these advantages by the combination and arrangement of parts for bringing the grain-feeder in the rear of the fertilizer-distributer, and immediately in front of the operator or planter. It is not so material that the feed of the fertilizer should be visible, although in my arrangement the planter's view of the falling fertilizer is not altogether obstructed; and, furthermore, I believe that my fertilizer-distributer is so accurate as to be almost, if not altogether, infallible. The brush $o$ serves to prevent the clogging of the cells, and this brush is secured to the rear wall of the hopper U on a bed, $p$, therein over the rim of the crown containing the grain-cells. The brush I prefer to use for economy and durability consists of a suitable quantity of bristles packed tight, without glue or heading or tying, in a cast-metal box, $q$, composed of a back, $q'$, having a longitudinal slot, $q^2$, in a lateral extension thereof, and forwardly-projecting sides $q^3$ $q^3$, and top cross-piece, $q^4$, of slightly less breadth than the sides. In this box, as stated, the brush-bristles are placed, and therein secured by a cap, $r$, engaging the sides $q^3$ by end lugs, $r'$, and the cross-piece $q^4$ by the lipped portion $r^2$, to make a tight joint therewith, said cap fitting in between the sides of the box and held in position, and holding in the bristles by a bolt and nut, $r^3$, passed through the box, bristles, and cap from rear to front. To further insure the retention of the bristles in the box, the cap $r$ is provided on its back, next the bristles, with transverse ribs $r^4$, which sink into the bristles and securely bind them in the box. The box is secured to the hopper-wall by a bolt, $r^5$, Figs. 3 and 6, passed through the slot $q^2$ and the wall of the hopper, and by means of this slot and bolt the brush may be adjusted vertically to compensate for wear. It is obvious from this construction the brush may be cheaply made and readily renewed.

Figure 11:
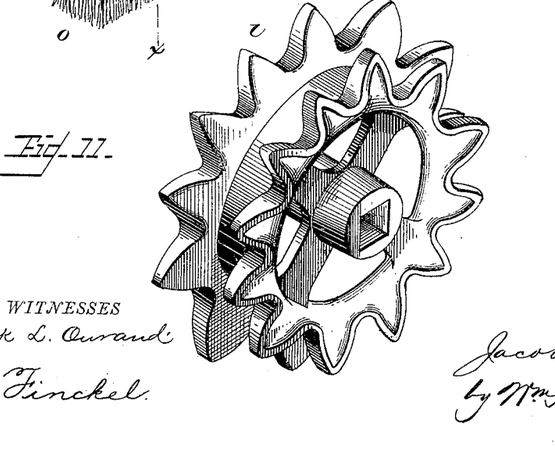
Fig. 11 is a perspective view of an improved form of change-gear for varying the speed or rapidity of rotation of the dropping mechanism.

As a matter of economy in construction and convenience in use, I prefer to make the change-gear as one casting with two sets of teeth constituting two wheels or gears of different diameter, and have so shown it in detail in Fig. 11. It is obvious that by this construction there are correspondingly fewer loose parts to be carried by the machine. A triple or other change-gear may be so made, but it is questionable if economical ends will be best subserved by more than a duplex casting.

The belt-tightener, to take up slack in using the change-gears, consists of a pulley, $s$, over which the chain S runs, revolving on a pin in a bracket, $s'$, pivoted at $s^2$ to the handle L, and this bracket is adjustable to vary the elevation of the pulley by means of a slotted segment, $s^3$, and bolt $s^4$, engaging the handle and slotted segment.

What I claim is—

1. The combination of the frame-work and driving-gearing of the fertilizer-distributing mechanism, and the corn-planting mechanism located at the rear of the fertilizer-distributing mechanism and so as to be in view of the operator, substantially as shown and described.

2. The combination, with the driving-wheel, its shaft, and the framing, of the reversing clutch-gear and the overhanging flat spring shield or guard, substantially as shown and described.

3. The combination, with the feeder and driving mechanism of a corn-planter, of the driving clutch-gear provided with the disconnecting member J, loosely fitted to the driving-shaft, and removable to render the driving-gearing inoperative, and the spring K, substantially as shown and described.

4. The combination, in a corn-planter, of a fertilizer-distributer arranged in front of the corn-planting mechanism, a standard or boot, and a pivoted valve arranged in such standard and operable to throw the fertilizer in front of the corn, partly in front and partly together with the corn, or altogether with the corn, substantially as described.

5. The combination, with the fertilizer-distributer, of the agitator having socketed and lipped base and a hub attached to the distributer and provided with lateral lugs to engage the socketed and lipped base to adapt the agitator for removable connection therewith, substantially as shown and described.

6. The combination, with the fertilizer-distributer, of the throat-cap having the elevated portion and large opening thereunder, substantially as shown in Fig. 13.

7. The combination, with the box $q$, having the walls $q^3$ $q^3$ and $q^4$, of the brush-bristles laid therein, and the cap $r$, engaging the walls of the box, and the bolt to hold said cap in place and bind the bristles in the box, substantially as shown and described.

8. The combination of a rotary plate positively driven, valves hinged thereto, a superposed grain-carrier from which the grain is discharged by the opening of such valves, and means, substantially as set forth, to set said valves to discharge one or more grains at a time, substantially as shown and described.

9. The combination of a rotary plate positively driven, valves hinged thereto, a grain-carrying plate removably attached to and moving with said valve-plate, a shipper-lever to set said valves to open, more or less, to discharge one grain at a time a given distance apart, or two grains twice such distance, substantially as described.

10. The combination, in a corn-planting mechanism, of a grain-carrier, a series of valves underneath the cells in said carrier, and having tappets, and a shipper having a cam-flange to engage said tappets, to throw the valves to discharge the grain, substantially as shown and described.

11. The combination, with the plate $j$, having arms $j^4$, of the valves $m$, having lips $m^3$, and pivoted to said arms, substantially as and for the purpose described.

12. In a combined corn-planter and fertilizer-distributer, a planting mechanism, a fertilizer-distributing mechanism, an outlet for each, and an outlet common to both, and a valve pivoted in said common outlet and operable to throw the fertilizer in front of the descending seed, or partly in front and partly together with the seed, or altogether with it, substantially as described.

In testimony whereof I have hereunto set my hand this 13th day of March, A. D. 1884.

JACOB W. SPANGLER.

Witnesses:
E. A. FINCKEL,
WM. H. FINCKEL.